3,529,020
OXIDATION PROCESSES EMPLOYING ALUMINO-
SILICATE CATALYSTS AND AN INITIATOR
Phillip S. Landis, Woodbury, N.J., assignor to Mobil Oil
Corporation, a corporation of New York
No Drawing. Filed Aug. 16, 1965, Ser. No. 480,132
Int. Cl. C07c *15/10, 51/18, 63/02*
U.S. Cl. 260—524
20 Claims

ABSTRACT OF THE DISCLOSURE

An oxidizable organic material is oxidized with free oxygen in the presence of (1) a heavy metal crystalline aluminosilicate having uniform pores sufficiently large to permit entry of at least a portion of said material, and (2) an oxidation initiator which is preferably present in said pores.

---

This invention relates to an improved process for the catalytic oxidation of organic compounds with molecular oxygen, and more particularly to such an oxidation process employing a novel catalyst system.

Numerous processes for the oxidation of organic compounds have been proposed in the art wherein such compounds are contacted with air or oxygen in the presence of various metals or salts, sometimes with the inclusion of a variety of organic reaction initiators or activators.

In general, these prior art methods have suffered various disadvantages and drawbacks including low conversions, undesirably lengthy reaction periods, low yields, incomplete oxidation and formation of undesirable side products, and the requirement for extreme reaction conditions of temperature and pressure entailing substantial expense. Moreover, these prior art methods have generally been found to be suitable only for the oxidation of specific hydrocarbons or groups of related hydrocarbons while apparently lacking activity for the oxidation of other hydrocarbons or other classes of organic compounds. Furthermore, the catalyst systems employed in many of the prior art processes have been extremely expensive in that the catalysts are rapidly deactivated, and are not subject to recovery or are subject to recovery only by complicated and costly procedures.

A primary object of the present invention is to provide a catalytic oxidation process which substantially overcomes or minimizes the above described disadvantages of prior art methods.

Another object of the present invention is to provide a method for the liquid phase catalytic oxidation of hydrocarbons utilizing a novel catalyst system whereby oxygenated products are recovered rapidly and in high yields.

Still another object of this invention is to provide such a process which involves reaction conditions that are readily controlled and operable at relatively low costs.

A further object of this invention is to provide a process for the oxidative dehydrogenation of a wide variety of organic materials by employing a novel catalyst system.

It is a further object of this invention to provide an oxidation process utilizing a novel heavy metal containing crystalline aluminosilicate catalyst system which may be readily recovered, regenerated and used repeatedly.

A still further object of this invention is to provide a catalyst system which may be employed in the oxidation of a wide range of hydrocarbons to produce desirable oxygenated products, particularly acids and aldehydes in a simple and efficient manner.

Other objects and advantages of the present invention will become apparent from a perusal of the following description.

In one of its broader aspects, the present invention relates to a process for oxidation of an oxidizable organic material which comprises contacting said material, in an atmosphere containing free oxygen, with a heavy metal crystalline aluminosilicate having uniform pores sufficiently large to permit entry of at least a portion of said material and an oxidation initiator.

According to one of its more specific aspects, the process of the present invention achieves oxidation of hydrocarbons by contacting said hydrocarbons in substantially liquid phase with oxygen, air or other oxygen-containing gas in the persence of heavy metal-containing crystalline aluminosilicates and in the presence of one or more oxidation "initiators" or "activators." If desired, the process may also be carried out in the presence of substantially inert solvents, i.e., solvents which are resistant to oxidation under the conditions of the process.

The preferred catalysts are prepared from crystalline aluminosilicates which are modified by the inclusion of heavy metals for use as catalysts in the present invention. Such crystalline aluminosilicate starting materials which are also known as zeolitic molecular sieves have been described in the comparatively recent prior art to have catalytic capabilities for various types of conversion reactions. These crystalline aluminosilicates include a wide variety of hydrogen or metal-containing aluminosilicates, both natural and synthetic. They can be described as a rigid three-dimensionl network of $SiO_4$ and $AlO_4$ tetrahedra in which the tetrahedra are cross-linked by the sharing of oxygen atoms whereby the ratio of the total aluminum and silicon atoms to oxygen atoms is 1:2. A complete description of zeolites of the type useable after modification in the present invention is found in Pat. 2,971,824, which disclosure is incorporated herein by reference. Further discussion of the nature of these catalysts and their methods of preparation is found in U.S. Pats. 2,882,244, 3,013,989 and 3,033,778. These aluminosilicates have well-defined intra-crystalline dimensions such that only reactant or product molecules of suitable size and shape may be transported in either direction between the exterior phase and the interior of the crystalline zeolite.

The minimum pore size of the heavy metal-containing aluminosilicates used in the process of this invention will depend upon the nature of the molecules involved in the reaction. Thus, when working, e.g. with certain branch-chain hydrocarbons or other compounds having large or complex molecules, it will be necessary to use aluminosilicates having a larger pore size, e.g. 10 to 15 angstroms, to permit the molecules to pass therethrough. When working, e.g. with unsubstituted straight-chain aliphatic hydrocarbons, the minimum pore size may be substantially less, as for example, about 5 angstroms. Accordingly, the catalysts of the present invention usually have pore sizes between 5 and 15 angstroms.

In their hydrated form, the parent aluminosilicates may be represented by the formula:

$$M_2O_n : Al_2O_3 : wSiO_2 : yH_2O$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be hydrogen or any one or more of a number of metal ions depending upon whether the aluminosilicate is synthesized or occurs naturally. Typically cations include sodium, lithium, potassium, silver, magnesium, zinc, barium, iron, manganese, calcium, rare-earths, cobalt, nickel, chromium, etc. The parent zeolite, if not received in dehydrated form commercially, is dehydrated to activate it for use as a catalyst. Although the proportions of inorganic oxides in the silicates and their spatial arrangement may vary, effecting distinct properties in the aluminosilicates, the two main characteristics of these materials are the presence in their molecular structure of at least 0.01 equivalent and preferably more than 0.1 equivalent of a hydrogen or metal ion per gram atom of aluminum and an ability to undergo dehydration without substantially affecting the $SiO_4$ and $AlO_4$ framework.

Numerous synthesized aluminosilicates having varying type structures have been disclosed in the prior art, and these aluminosilicates have been designated by their structure, as for example, zeolites X, Y, L, D, R, S, T, Q and B.

Among the naturaly occurring crystalline aluminosilicates which can be employed for purposes of the invention are included faujasite, heulandite, clinoptilolite, dachiardite and aluminosilicates represented as follows wherein metal cations other than those shown may be present.

Chabazite: $Na_2O \cdot Al_2O_3 \cdot 4SiO_2 \cdot 6H_2O$
Gmelinite: $Na_2O \cdot Al_2O_3 \cdot 4SiO_2 \cdot 6H_2O$
Mordenite: $Na_8(AlO_2)_8(SiO_2)_{40} 24H_2O$ Among the most preferred aluminosilicates for use in this invention are cation-exchanged natural and synthetic faujasite. By the term "synthetic faujasite" is meant those synthetic aluminosilicates having a structure and properties extremely similar to naturally occurring faujasite and an $SiO_2/Al_2O_3$ ratio of 2 to 6 or higher. Typical of these synthetic faujasite are zeolite X and Y described above For purposes of this description and appendant claims, the term "faujasite" is intended to include naturally occurring faujasite and synthetic faujasite.

The heavy metal contained in the crystalline aluminosilicates used as catalysts in the present invention may be present in elemental form, in ionic form, or in combined form as, e.g. oxides.

The heavy metal forms of the metal-containing aluminosilicates may be suitably prepared from the e.g. sodium forms thereof by a variety of techniques including the conventional replacement technique, involving the contacting of the crystalline sodium aluminosilicate zeolite with a solution of an ionizable compound of the heavy metal which is to be exchanged into the molecular sieve structure for a sufficient time to bring about the extent of desired introduction of such heavy metal. Repeated use of fresh solutions of the entering heavy metal cation is of value to secure more complete exchange. After such treatment, the resulting exchanged product is water-washed, dried and dehydrated.

In preparing the heavy metal forms of the catalyst composition, the aluminosilicate can be contacted with a nonaqueous or aqueous fluid medium comprising a gas, polar solvent of water solution containing the desired heavy metal salt soluble in the fluid medium. Water is the preferred medium for reasons of economy and ease of preparation in large scale operations involving continuous or batchwise treatment. Similarly, for this reason, organic solvents are less preferred, but can be employed providing the solvent permits ionization of the heavy metal salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide and the like.

The heavy metal cation may be present in the fluid medium in an amount varying within wide limits dependent upon the pH value of the fluid medium. Where the aluminosilicate material has a molar ratio of silica to alumina greater than about 5.0, the fluid medium may contain a metal cation equivalent to a pH value ranging from less than 4.0 up to a pH value of about 10.0, preferably between 4.5 and 8.5. Where the silica:alumina molar ratio is greater than about 2.2 and less than about 5.0, the pH value for the fluid media containing a metal cation ranges from 3.8 to 8.5. Thus, depending upon the silica to alumina ratio, the pH value varies within rather wide limits. It is preferred that the aluminosilicates have a silica:alumina ratio of 5:1 and higher.

In carrying out the treatment with the fluid medium the procedure employed comprises contacting the aluminosilicate with the desired fluid medium or media until such time as metallic cations originally present in the aluminosilicates are exhausted to the desired degree and replaced by heavy metal ions. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e. between about 5 and 8 and air dried. The aluminosilicate material is thereafter analyzed for cation content by methods well-known in the art. Analysis also involves analyzing the effluent wash for anions contained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the heavy metal cations in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed.

In the description above it has been shown how the heavy metals may be incorporated into the crystalline aluminosilicate in the form of cations. Where it is desired to have the heavy metals present in their elemental form, this may be conveniently done by intimately contacting the heavy metal-exchanged crystalline aluminosilicate with a reducing agent such as alkali metal vapors or gaseous hydrogen whereby the cations of the metal to be deposited are reduced to the elemental metal.

Another method for depositing the heavy metals in elemental form within the crystalline aluminosilicates comprises contacting the aluminosilicates with an aqueous solution of a heavy metal-amine complex whereby ion-exchange occurs between the complex cations and the exchangeable cations of the aluminosilicates. The exchanged aluminosilicates are then dried, activated in an inert atmosphere and the complex cations reduced to the elemental metal by heating the aluminosilicates up to a temperature of about 350° C. in a flowing stream of inert dried gas or in vacuum whereby the complex cation is destroyed, thereby depositing the metal in a very highly dispersed form in the inner absorption area of said crystalline aluminosilicates and cooling the product. This method is limited to treatment of crystalline aluminosilicates having a pore size sufficiently large to permit entry of the heavy metal-amine complex cations into the inner absorption area of the zeolitic molecular sieve.

If it is desired to obtain the crystalline aluminosilicates having the heavy metals contained therein in combined form, for example, in the form of oxides, this is simply done by passing oxygen or air through a bed of the zeolitic molecular sieves containing heavy metal in elemental form at elevated temperatures until the elemental metal has been converted to the oxides. The term "heavy metal" is employed herein in the same sense as employed in connection with the metals shown in the "Periodic Chart of Elements," appearing on pp. 56 and 57 of the "Handbook of Chemistry," 8th ed., published by Handbook Publishers, Inc., Sandusky, Ohio (1952). Of the heavy metal group, those metals having an atomic number not greater than 84 have been found most useful. Excellent results are obtained by the utilization of metals having an atomic number of from 23 to 28 inclusive. Particularly excellent results are obtained with a metal of the group consisting of manganese and cobalt. Other very suitable metals are nickel, iron, chromium, vanadium, molybdenum, tungsten, tin and cerium. It is also contemplated, according to the practice of the present invention, that two or more heavy metals may be incorporated within the aluminosilicates rather than a single heavy metal. The amount of heavy metal added may vary considerably so long as the crystallinity of the aluminosilicate is maintained.

A wide variety of heavy metal salts can be employed with facility as the source of heavy metal cations to be introduced into the aluminosilicates. Representatives of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates, mixtures thereof and the like. The only limitation on the particular metal salt or salts employed is that it be soluble in the fluid medium in which it is used. The preferred salts are the chlorides, nitrates, acetates and sulfates.

The catalyst may be used in powdered, granular or molded state formed into spheres or pellets of finely divided particles having a particle size of 2 to 500 mesh. In cases where the catalyst is molded, such as by extrusion, the aluminosilicate may be extruded before drying, or dried, or partially dried and then extruded. The catalyst product is then preferably precalcined in an inert atmosphere near the temperature contemplated for conversion but may be calcined initially during use in the conversion process. Generally, the aluminosilicate is dried at between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The preferred catalysts just described may be used as such or distributed in a predetermined amount of an inert and/or catalytically active material which serves as a base, support, carrier, binder, matrix or promoter for the aluminosilicate. Thus, the aluminosilicate may be distributed in a clay binder. A particularly preferred catalyst form is an aluminosilicate dispersed in a dried inorganic oxide amorphous gel. The siliceous gel-aluminosilicate product may be prepared in any desired physical form. Generally spherical beads may be prepared by dispersing the aluminosilicate in an inorganic oxide sol according to the method described in U.S. Pat. 2,900,399 and converting to a gelled bead according to the method described in U.S. Pat. 2,384,946.

As previously indicated, a further aspect of the present invention requires that the oxidation reactions be conducted not only in the presence of the aforedescribed crystalline aluminosilicate catalysts, but also in the presence of "initiators" or "activators." The use of initiators or activators with molecular oxygen and metal catalysts is not per se novel and it is to be understood therefore that it is their use only in combination with the particular catalyst system described above which forms a part of the present invention. These initiators, as is well known in the art, are substances capable of initiating attack on the hydrocarbon material by molecular oxygen more readily than would be the case in their absence. Broadly, any readily oxidized organic compound or readily dissociated halogen may be employed as an initiator. Among the "initiators" which may be employed in the present invention are inorganic peroxides such as sodium or hydrogen peroxide; organic peroxides, such as benzoyl peroxide; per acids, such as per-acetic and per-benzoic acids; the aldehydes such as acetaldehyde, propionaldehyde, and isobutyraldehyde; ketones, such as acetone, methyl ethyl ketone, diethyl ketone, and cyclohexanone; ethers, such as diisopropyl, diethyl and diamyl ethers; and, in fact, any organic compound which tends to form peroxide bodies under the reaction conditions. Other easily oxidized organic materials such as cyclohexene, cumene, dicyclohexyl, and phenylcyclohexane may also be employed. Further, the initiator may be bromine, chlorine or iodine either in their elemental form or in the form of their salts, e.g., ammonium bromide, potassium bromide, or acids, e.g., hydrogen bromide, etc. The preferred initiators, e.g., bromine, have a configuration which allows the initiators to enter within the pores or active sites wtihin the catalysts.

The initiator may be added to the reactants at the start or continuously during the oxidation or both. The proportions of initiators which are desirable according to this invention, range from about 0.1 to 5% based upon the weight of the hydrocarbon being treated, and preferably from 0.5 to 1.0 weight percent. In order to maintain such proportion of initiator present in the reaction throughout the process care should be taken to either provide sufficient initiator at the beginning of the reaction or add additional initiator as the reaction proceeds.

In carrying out the process of the present invention there may be employed, if desired, a solvent. The solvent may be substantially any material having suitable solvent powers and which is resistant to oxidation under the reaction conditions. For purposes of this specification, such a solvent is termed an inert solvent. Among the materials which may be employed, there may be mentioned aliphatic monocarboxylic acids from 2 to 8 carbon atoms, preferably acetic acid or propionic acid.

The present invention has application to a wide range of oxidizable compounds which desirably contain easily abstracted hydrogen atoms. Useable compounds include aliphatic and aromatic aldehydes, alcohols, ketones, acids, and hydrocarbons. The compounds to be oxidized in the process of this invention should comprise at least in major proportion molecules having molecular configuration which permits passage into the pores of heavy metal-containing aluminosilicates and egress therefrom of the oxidized products. Though the crystalline aluminosilicates possess a rather large surface area and therefore offer some catalytic activity at numerous surface sites, this "surface activity" represents a small proportion of the activity within the aluminosilicates in view of the tremendously greater area within the pores of the zeolitic molecular sieves. Accordingly, though oxidation of some highly branched or complicated molecules too large to pass through the pores of the aluminosilicates is achieved through contact with catalytic sites on the surface of the aluminosilicates; the major proportion of the feed should be of such molecular configuration as to permit passage through the pores for contact with the catalytic sites within the aluminosilicates.

Representative aldehydes include acetaldehyde, propionaldehyde, isobutyraldehyde and benzaldehyde. Suitable alcohols include ethanol, isopropanol, sec butyl alcohol cyclohexanol, and benzyl alcohol. Representative ketones include acetone, methyl ethyl ketone, diethyl ketone, and cyclohexanone. Alkyl substituted acids such as toluic acid may also be employed.

The present invention has particular utility in the oxidation of hydrocarbons. The hydrocarbons which may be oxidized according to the process of this invention comprise pure compounds of aliphatic or aromatic nature or mixed feeds from natural or synthetic sources. Thus, the hydrocarbons may include gasoline, kerosene, crude petroleum or any desired fractions thereof. They may be paraffinic or olefinic in nature or comprise mixtures of both types of hydrocarbons. Thus, they may include the hydrocarbon liquids obtained from the Fischer-Tropsch Synthesis which are primarily olefinic in nature varying from normal 1-olefins to tertiary and other branched olefins, but including normal and branched paraffins and even some aromatics.

As indicated above, the hydrocarbons to be oxidized may be aliphatic or aromatic in nature. They may be acycloaliphatic or cycloaliphatic compounds such as methane, propane, butane, pentane, hexane, heptane, octane, nonane, decane, undecane, dodecane, octadecane, and other members of the homologous series and isomers thereof; cyclobutane, cyclopentane, cyclohexane, cycloheptane, cyclooctane and various alkyl or alkenyl substituted derivatives of these cyclic aliphatic hydrocarbons.

The aliphatic hydrocarbons may also be olefinic in nature, containing one or more double bonds. Thus, there are included propene, butenes, pentenes, and other homologs containing a single double bond; butadiene, pentadiene, hexadiene, octadiene and other members of the homologous series containing two double bonds as well as branched and isomeric derivatives of such hydrocarbons.

Representative aromatic hydrocarbons include compounds of the benzene and naphthalene series, as well as alkyl and alkenyl substituted derivatives thereof. Among such hydrocarbons there may be mentioned toluene, xylenes, ethylbenzens, propylbenzenes such as isopropyl benzene, as well as other well known mono-, di-, and trialkyl or alkenyl substituted benzenes.

The nature of the oxidation products derived from the process of this invention will, of course, depend upon the nature of the feed as well as the specific catalyst system employed and the process conditions. When using a highly heterogeneous feed there may be produced a variety of oxidized compounds including acids, aldehydes, ketones and alcohols. When utilizing a homogeneous feed, for example, a single hydrocarbon compound the catalyst and process conditions may usually be so chosen as to produce the desired acid, aldehyde, ketone or alcohol in good yield.

The invention has been found particularly suitable in the oxidation of xylene to terephthalic acid, toluene to benzoic acid, and of cyclohexane to cyclohexanol and cyclohexanone, or to adipic acid. The invention is also particularly suitable for oxidative dehydrogenation reactions, e.g., the reaction of ethylbenzene and oxygen to form styrene and water, and of benzyl alcohol and oxygen to form benzaldehyde.

Other reactions representative of the present invention include the oxidation of ethanol to acetaldehyde, isopropanol to acetone, t-butanol to α-hydroxyisobutyric acid, cyclohexane to cyclohexanone, methyl ethyl ketone to acetic acid, and benzaldehyde to benzoic acid.

The process of this invention may be conducted batchwise, semi-continuously or continuously. As previously indicated, the process may be carried out in either liquid or vapor phase. It should be understood, however, that depending upon the nature of the reactants and the process conditions, the process may be carried out so that the reactants exist in a mixed liquid-vapor phase, for example, where the hydrocarbon feed comprises a mixture of lower and higher boiling point materials.

In general, the process may be carried out under atmospheric, subatmospheric or superatmospheric pressures. It is preferred for the sake of convenience that atmospheric pressures be utilized. In general, the pressure may vary from 1 p.s.i.g. to 100 p.s.i.g. The temperature of reaction will also vary somewhat depending upon whether the reaction is to be conducted in a gas phase or liquid phase, the nature of the reactants, and the specific catalyst system employed. In general, however, the temperature should range from 0° to 400° C., and preferably from 100° to 400° C. The LHSV should be between about 0.5 to 20.

In carrying out the process it is preferred that the catalyst and initiator be stirred within the feed with or without a solvent to form slurry through which the oxygen or oxygen-containing gas is passed. As an alternative procedure, the catalyst may be arranged in a fixed bed through which the hydrocarbon reactants with or without a solvent and containing the desired initiator are passed with concurrent or countercurrent passage of oxygen or oxygen-containing gas. In some cases it may be desirable to use a fixed bed batch process wherein a single charge is placed in the container containing the catalyst and initiator through which oxygen is subsequently passed until reaction is completed.

Regardless of the process employed, it is found that the catalyst may be removed following the reaction and subsequently regenerated by solvent extraction of any hydrocarbon material remaining within the catalyst and thereafter heating the catalyst in air to burn off coke deposits to ready the catalyst for reuse.

From the foregoing description, it is apparent that certain easily oxidizable aldehydes and ketones may in some systems be the "oxidizable organic material" and in other systems may function as "initiators" for less easily oxidizable organic materials. For example, methyl ethyl ketone may be considered an "oxidizable organic material" that can be converted to acetic acid under certain conditions, and under other conditions may be employed as an "initiator", for example, for the oxidation of xylene to terephthalic acid. In practice, no ambiguity exists for one skilled in the art concerning the function of said compounds in any given system. The term "initiator" as used herein and in the appended claims refers to a substance which in any given system oxidizes at temperatures considerably below the "oxidizable organic material" of said system, and which is present in an amount smaller than the amount of the oxidizable organic compound. The initiator is usually present in an amount of about 0.1 to 30% by weight compared to the oxidizable organic material. The initiator thus allows the primary oxidization reaction (the oxidization of the oxidizable organic material) to proceed at reasonable rates at temperatures well below that at which the oxidization reaction would take place in the absence of the initiator. The use of an initiator may also be effective to achieve selective oxidization of the oxidizable organic material. It will be appreciated that the above discussion and definition exclude the initiator and oxidizable organic material in a given system from being the same compound.

To elucidate the present invention the following specific examples are presented which are to be considered merely as illustrative rather than as limiting on the invention.

The following examples illustrate vapor phase oxidation reactions in accordance with the present invention.

EXAMPLE I

Zeolite Y was partially exchanged with manganese upon prolonged treatment of the zeolite with a large excess of 2 normal aqueous manganese dichloride at room temperature. The manganese containing zeolite Y thus obtained was heated in air at 300° C. The color of the zeolite changed in a reversible manner from white to dark brown indicating that the manganese was oxidized reversibly to a higher oxidation state, probably plus 4.

To a reactor containing the thus prepared manganese zeolite Y there was added benzyl alcohol at a liquid hourly space velocity of 6.0, and air at a rate of 8.5 liters per hour, while maintaining a temperature of about 250° C. within the reactor. The reaction was terminated after the reaction appeared to have reached completion. The products of the reaction contained benzaldehyde in 9% yield.

The above reaction was repeated with the exception that one weight percent bromine based on the weight of benzyl alcohol was added to the reactor as an initiator. In this case, the yield of benzaldehyde increased to 14%.

EXAMPLE II

To a reactor containing manganese zeolite Y prepared as in Example I, there was added benzyl alcohol at a liquid hourly space velocity of 6.0, and 10 liters of air hour, while maintaining the temperature at 350° C. At the completion of the reaction, there was obtained from the products benzaldehyde in 14% yield.

When the above reaction was repeated with the addition of one weight percent bromine based on the weight of benzyl alcohol, there was obtained benzaldehyde in 18% yield.

EXAMPLE III

Upon repeating the two above runs employing an initiator substituting a cobalt containing zeolite Y as the catalyst, a corresponding increase in yield may be obtained when employing bromine as an initiator.

EXAMPLE IV

Ethyl benzene at a liquid hourly space velocity at 6.0, and 10 liters of air per hour were added to a reactor containing manganese zeolite Y while maintaining the reaction temperature at about 350° C. At the completion of the reaction, styrene was present in the products in 6% yield.

When the above reaction was repeated with the addition of one percent of bromine based on the weight of ethyl benzene, the yield of styrene increased to 11%.

The following examples illustrate liquid phase reactions in accordance with the process of the present invention.

EXAMPLE V

Air was bubbled into a reactor containing manganese zeolite Y, p-xylene, acetic acid, the latter being employed as an inert solvent, and 0.5 weight percent of bromine based on the p-xylene. The addition of air was continued with agitation until the reaction reached completion. From the reaction products there was recovered terephthalic acid in higher yield than in a corresponding control reaction without an initiator.

Comparable results are obtainable when the catalyst employed is natural faujasite to which there has been added cobalt.

EXAMPLE VI

The reactions of Example V were repeated employing methyl ethyl ketone as the initiator in lieu of bromine. In each instance, increased yields were obtained over corresponding reactions wherein no initiator was employed.

It is to be understood that the foregoing description is merely illustrative of the preferred embodiments of the invention of which many variations may be made by those skilled in the art within the scope of the following claims without departing from the spirit of the invention.

What is claimed is:

1. A process for oxidizing an oxidizable organic material selected from the group consisting of aliphatic hydrocarbons, cycloaliphatic hydrocarbons, benzyl alcohol and alkyl and alkenyl substituted benzenes which comprises contacting said material, in an atmosphere containing free oxygen, with a heavy metal crystalline aluminosilicate having uniform pores sufficiently large to permit entry of at least a portion of said material, and an oxidation initiator.

2. A process according to claim 1, wherein said heavy metal is cobalt.

3. A process according to claim 1, wherein said heavy metal is manganese.

4. A process according to claim 1, wherein the reaction temperature is maintained between about 100° to 400° C.

5. A process according to claim 1, wherein said material is present in substantially liquid phase.

6. A process for oxidizing an oxidizable organic material selected from the group consisting of lower alkyl and lower alkenyl substituted benzenes, which comprises contacting said material, in an atmosphere containing free oxygen, with a heavy metal crystalline aluminosilicate having uniform pores sufficiently large to permit entry of at least a portion of said material and having an oxidation initiator present in said pores, for a period of time sufficient to cause oxidation of said material.

7. A process according to claim 6, wherein said initiator is selected from the group consisting of bromine and a bromide.

8. A process for oxidizing an oxidizable organic material selected from the group consisting of olefinic hydrocarbons having up to about 8 carbon atoms, alkyl hydrocarbons having up to about 18 carbon atoms, benzyl alcohol and lower alkyl and lower alkenyl substituted benzenes, said material containing at least a major portion of molecules of such dimensions as to permit passage into molecular sieves having pore diameters of about 5 to 15 angstroms, comprising contacting an oxygen-containing gas with said material in the presence of a heavy metal crystalline aluminosilicate catalyst having an oxidation initiator in its pores.

9. A process according to claim 8, wherein said heavy metal is selected from the group consisting of cobalt, manganese, nickel, iron, chromium, vanadium, molybdenum, tungsten, tin and cerium.

10. A process according to claim 8, wherein the contacting step is conducted by passing an oxygen containing gas through a stirred slurry of said catalyst and said organic material.

11. A process according to claim 8, wherein the contacting step is conducted by passing said organic material and said oxygen containing gas through a fixed bed of said catalyst.

12. A process according to claim 8, wherein the aluminosilicate catalyst is a heavy metal faujasite.

13. A process according to claim 8, wherein the aluminosilicate catalyst is a heavy metal zeolite Y.

14. A process according to claim 8, wherein said initiator is selected from the group consisting of bromine, a bromide, methyl ethyl ketone, cumene, and a dialkyl ether.

15. A process according to claim 8 wherein said organic material is a hydrocarbon.

16. A process for oxidizing xylene to terephthalic acid which comprises contacting xylene, in an atmosphere containing free oxygen, with a heavy metal crystalline aluminosilicate having substantially uniform pores sufficiently large to permit entry of said xylene and containing an oxidation initiator in said pores, for a period of time sufficient to produce terephthalic acid.

17. A process for oxidizing cyclohexane to adipic acid which comprises contacting cyclohexane, in an atmosphere containing free oxygen, with a heavy metal crystalline aluminosilicate having substantially uniform pores sufficiently large to permit entry of said cyclohexane and containing an oxidation initiator in said pores, for a period of time sufficient to produce adipic acid.

18. A process for oxidizing toluene to benzoic acid which comprises contacting toluene, in an atmosphere containing free oxygen, with a heavy metal crystalline aluminosilicate having substantially uniform pores sufficiently large to permit entry of said toluene and containing an oxidation initiator in said pores, for a period of time sufficient to produce benzoic acid.

19. A process for oxidizing ethyl benzene to styrene which comprises contacting ethyl benzene, in an atmosphere containing free oxygen, with a heavy metal crystalline aluminosilicate having substantially uniform pores sufficiently large to permit entry of said ethyl benzene and containing an oxidation initiator in said pores, for a period of time sufficient to produce styrene.

20. A process for oxidizing benzyl alcohol to benzaldehyde which comprises contacting benzyl alcohol, in an atmosphere containing free oxygen, with a heavy metal crystalline aluminosilicate having substantially uniform pores sufficiently large to permit entry of said benzyl alcohol and containing an oxidation initiator in said pores, for a period of time sufficient to produce benzaldehyde.

References Cited

UNITED STATES PATENTS

| | | | |
|---|---|---|---|
| 1,840,450 | 1/1932 | Jaeger et al. | 260—687 |
| 1,851,342 | 3/1932 | Jaeger | 260—524 |
| 2,245,528 | 6/1941 | Loder | 260—524 |
| 3,170,768 | 2/1965 | Baldwin | 260—524 |
| 3,371,110 | 2/1968 | Hamilton et al. | 252—455 |

LORRAINE A. WEINBERGER, Primary Examiner

R. S. WEISSBERG, Assistant Examiner

U.S. Cl. X.R.

260—523, 531, 533, 541, 586, 596, 599, 603, 631, 669